(No Model.) 2 Sheets—Sheet 2.
C. H. WARRINGTON.
EGG BEATER.

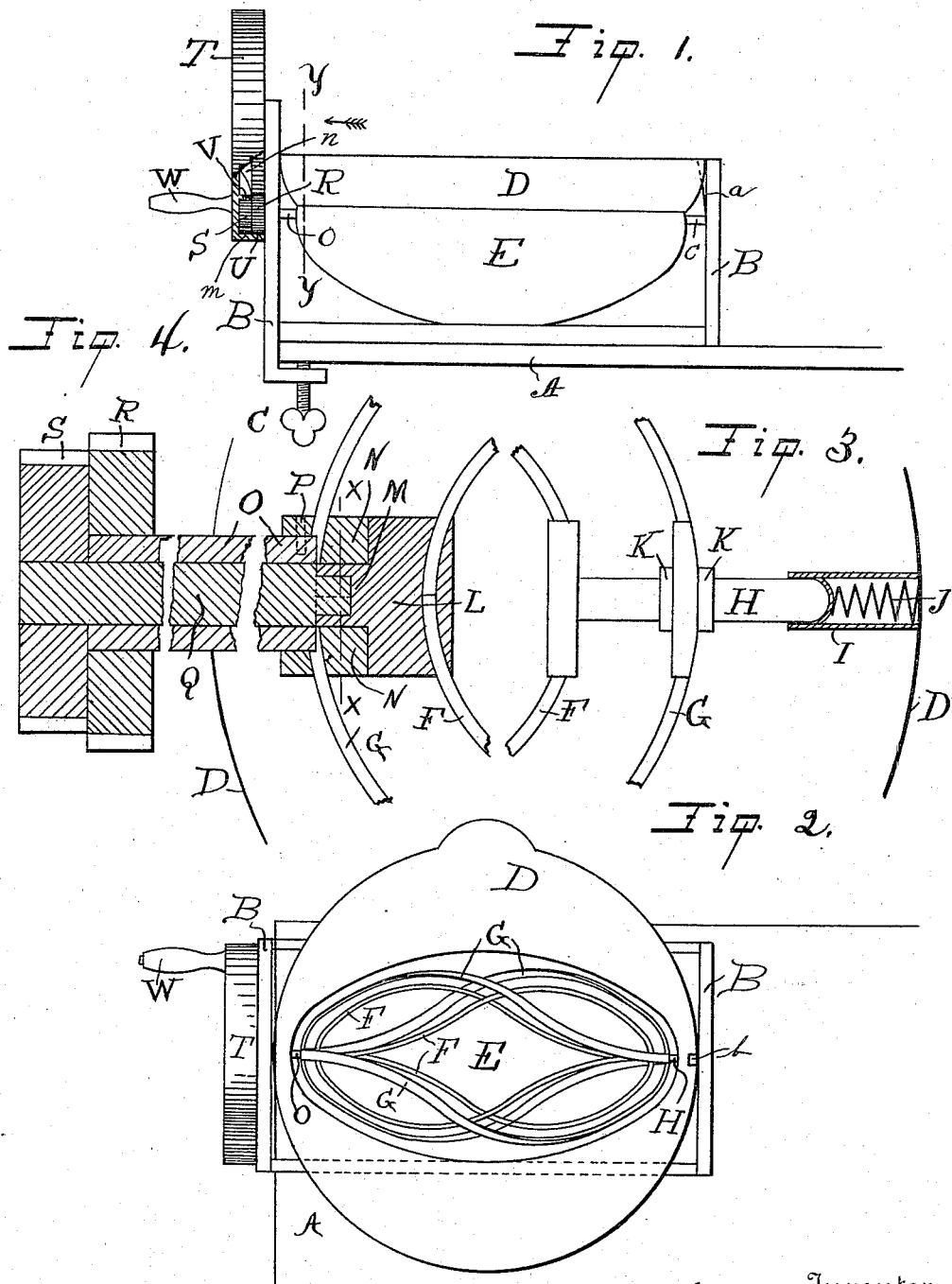

No. 535,474. Patented Mar. 12, 1895.

Witnesses
Molbry Haynes
L. B. Hodge

Inventor
Claude H. Warrington
By Joshua B. Webster
Attorney

UNITED STATES PATENT OFFICE.

CLAUDE H. WARRINGTON, OF STOCKTON, CALIFORNIA.

EGG-BEATER.

SPECIFICATION forming part of Letters Patent No. 535,474, dated March 12, 1895.

Application filed October 16, 1894. Serial No. 526,032. (No model.)

*To all whom it may concern:*

Be it known that I, CLAUDE H. WARRINGTON, a citizen of the United States, residing at Stockton, in the county of San Joaquin and State of California, have invented certain new and useful Improvements in Egg-Beaters; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to certain new and useful improvements in that class of egg-beaters that is used in the preparation of eggs for cooking in large quantities and it consists in double spiral cutters arranged in circular form and adapted to revolve in opposite directions, such cutters being pivotally hung in an oblong bowl; suitable gearing and such other devices and combination of devices as will be more fully described in the specification and pointed out in the claim, reference being had to the accompanying drawings, in which—

Figure 5:
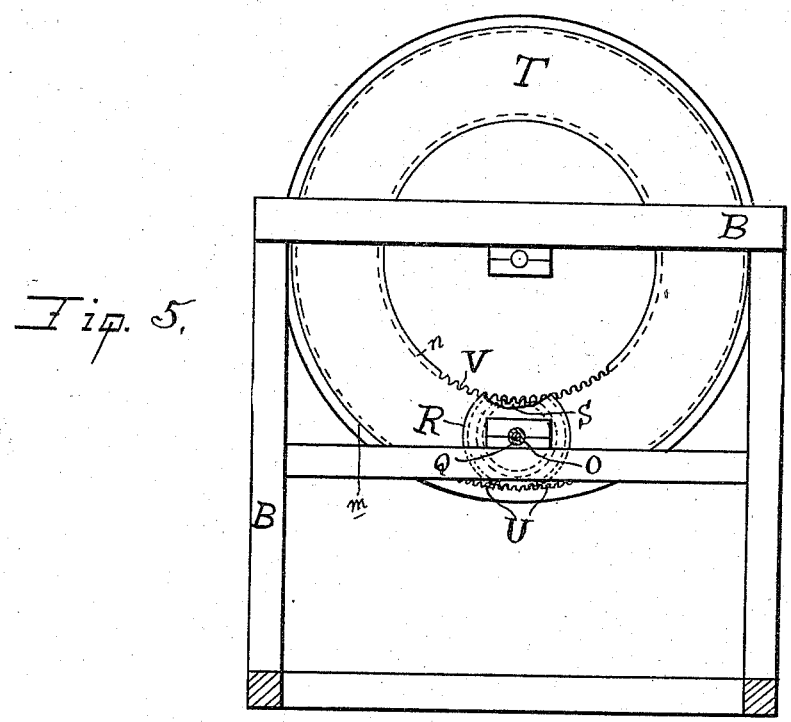
Figure 6:
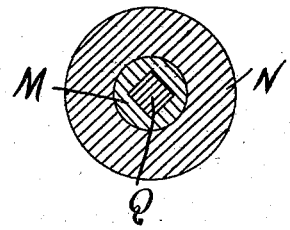
Figure 7:
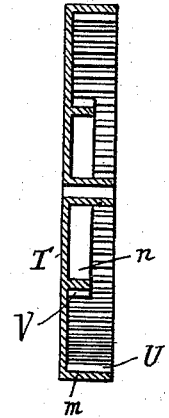

Figure 1 is a side elevation of my improved egg-beater. Fig. 2 is a plan view of the same. Fig. 3 is a detached view of the rear ends of the beaters. Fig. 4 is a detached sectional view of the front ends of the beaters and the gear wheels. Fig. 5 is an enlarged sectional view through line Y. Y. Fig. 1. Fig. 6 is a sectional view through line X. X. Fig. 4. Fig. 7 is a detail, diametrical section of the hand wheel.

A represents the top of a table upon which a frame B is mounted and is rigidly attached thereto by means of a thumb screw C which is inserted in the frame beneath and is adapted to impinge upon the under surface of the table A.

D represents a bowl provided with an oblong depression E, such bowl D being pivotally suspended in the frame B.

Within the depression E are flexibly inserted circular oblong cutters or beaters F and G, the former within the latter, such beaters being flat and having their blades twisted and being adapted to revolve in opposite directions thereby thoroughly cutting and mixing the eggs. The beaters F, at their ends, are rigidly attached to a horizontal shaft H, which is adapted to engage with a socket I which is rigidly attached to the rear side of the bowl D.

J, represents a spiral spring which is inserted in the socket I and adapted to engage with the outer end of the shaft H for the purpose of pressing the beaters F and G in contact with certain shafts hereinafter described.

The shaft H is provided near its center with collars K which are rigidly attached thereto. Such collars K are adapted to receive the beaters G between the same which beaters are journaled thereon.

The beaters F at their front ends are inserted in a circular hub L which is provided with a stem M which stem is inserted into a hub N, to which hub N, is attached, the front ends of the beaters G.

O represents a hollow shaft which is inserted through the side of the bowl D and which shaft engages with the hub N and is held rigid, with relation to the hub N, by means of a pin P shown in dotted lines Fig. 4.

Q represents a solid shaft which is loosely inserted within the hollow shaft O and adapted to engage with the stem M of the hub L, there being a depression in the end of such stem for that purpose.

The outer ends of the shafts O and Q are provided with pinions R and S respectively which pinions are rigidly attached to such shafts.

T, indicates a hand wheel which is journaled on the side of the frame B, and is provided with a handle W, whereby it may be readily turned. This wheel T, is provided with a peripheral flange $m$, and an inner circular flange $n$, of less diameter than the peripheral flange; and the said peripheral flange is provided on its inner side with cog teeth U, designed and adapted to engage the pinion R, while the inner flange $n$, is provided on its outer side with cog teeth V, designed and adapted to engage with the pinion S. Thus it will be seen that when the wheel T, is turned, the shafts O, Q, will be rotated in opposite directions for a purpose presently described.

$a$, represents a spring catch which is rigidly attached at one end to the side of the frame B, such spring being adapted to engage with a slot, $b$, which is cut in the edge of the bowl D.

$c$, represents a journal which is rigidly attached to the rear side of the bowl D for the purpose of allowing the same to be tilted, such bowl having its other journal on the shaft O.

The mode of operating my improved egg-beater is as follows:—After the eggs have been broken and the contents deposited in the bowl D E, the operator grasps the handle W and rotates the wheel T, which by means of the cogs V and U and pinions S and R, rotates the shafts Q and O in opposite directions, which shafts Q and O carry with them the beaters F and G which, as will be plainly seen, cut and beat the eggs thoroughly. When the eggs have been sufficiently beaten the operator releases the spring, $a$, from the slot, $b$, and the bowl D E, is tilted and the contents are deposited into any portable vessel. The bowl is then righted and held in such position by the spring, $a$. The beaters F and G are then pressed rearwardly thus releasing the hubs L and N from the shafts Q and O. The front ends are then raised and the rear end is drawn from the socket I. The bowl and beaters are then easily washed and the beaters replaced ready for use again.

Having thus described my invention, what I claim as new, and desire to secure by Letters Patent, is—

In an egg-beater, the combination of a frame suitably mounted on a table a thumb screw C, adapted to fix the frame on the table, a bowl D, provided with the oblong depression E, pivotally suspended in such frame, the beaters F and G, adapted to revolve in opposite directions, such beaters being provided with the hubs L and N, such beaters being pivotally mounted in the depression E, the shaft H rigidly attached to the beaters F and loosely attached to the beaters G, such shaft H being adapted to engage with the socket I and spring J, the socket I rigidly attached to the side of the bowl D, the shafts O and Q, which are adapted to engage with the hubs N and L, the pinions R and S rigidly attached to the shafts O and Q, respectively, and the hand wheel T provided with the cogs U and V which are adapted to engage with the pinions R and S, all arranged and operating substantially as shown and described.

In testimony whereof I affix my signature in presence of two witnesses.

CLAUDE H. WARRINGTON.

Witnesses:
MOLBRY HAYNES,
JOSHUA B. WEBSTER.